(12) United States Patent
Kibler et al.

(10) Patent No.: US 8,944,484 B2
(45) Date of Patent: Feb. 3, 2015

(54) PRESSURIZED LOCKING ASSEMBLY FOR A SIDE-SWING TAILGATE AND A TAILGATE INCORPORATING THE SAME

(71) Applicant: Mac Trailer Manufacturing, Inc., Alliance, OH (US)

(72) Inventors: Scott A. Kibler, Alliance, OH (US); Michael A. Conny, Beloit, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 0 days.

(21) Appl. No.: 13/835,226

(22) Filed: Mar. 15, 2013

(65) Prior Publication Data

US 2014/0265518 A1    Sep. 18, 2014

(51) Int. Cl.
*B60P 1/273* (2006.01)

(52) U.S. Cl.
CPC ........................... *B60P 1/273* (2013.01)
USPC ............................................................. 296/50

(58) Field of Classification Search
CPC ........... B60P 1/04; B60P 1/26; B62D 33/023; B62D 33/0276; B62D 33/03; B62D 33/037
USPC ...................................... 296/50, 51, 56, 57.1
See application file for complete search history.

(56) References Cited

U.S. PATENT DOCUMENTS

| 2,589,872 | A | | 3/1952 | Schetky |
| 3,099,205 | A | | 7/1963 | Lovrinch |
| 3,387,406 | A | * | 6/1968 | Coker et al. .................... 49/192 |
| 3,440,764 | A | | 4/1969 | Cover |
| 3,592,504 | A | * | 7/1971 | Sandor ............................ 296/70 |
| 4,076,301 | A | * | 2/1978 | Gergoe .......................... 296/50 |
| 4,307,541 | A | | 12/1981 | Farmer et al. |
| 4,691,956 | A | * | 9/1987 | Hodge ............................ 296/51 |
| 5,890,770 | A | * | 4/1999 | Palmberg, Jr. .......... 298/23 MD |
| 6,053,545 | A | * | 4/2000 | Asmundson et al. ......... 292/210 |
| 6,217,123 | B1 | * | 4/2001 | Palmberg, Jr. .......... 298/23 MD |
| 6,412,877 | B1 | * | 7/2002 | Faison ....................... 298/23 M |
| 6,880,895 | B1 | * | 4/2005 | Brown et al. .............. 298/23 M |
| 2003/0122396 | A1 | * | 7/2003 | Humphrey et al. ............. 296/51 |
| 2005/0035620 | A1 | * | 2/2005 | Ichinose ........................ 296/51 |
| 2006/0152029 | A1 | * | 7/2006 | Tomasson et al. .............. 296/51 |
| 2007/0262601 | A1 | * | 11/2007 | Shoemaker .................... 296/51 |
| 2007/0284903 | A1 | * | 12/2007 | Waldner et al. ................. 296/51 |
| 2008/0252092 | A1 | * | 10/2008 | Waldner et al. ................. 296/51 |
| 2009/0250959 | A1 | * | 10/2009 | Townson et al. ................ 296/51 |
| 2009/0250960 | A1 | * | 10/2009 | Townson et al. ................ 296/51 |
| 2011/0254289 | A1 | | 10/2011 | Calamia, III |
| 2012/0061987 | A1 | * | 3/2012 | Fraley et al. ................... 296/51 |

* cited by examiner

*Primary Examiner* — H Gutman
(74) *Attorney, Agent, or Firm* — Sand & Sebolt (57) ABSTRACT

A locking assembly and method of securing a dump truck tailgate to a sidewall of the dump truck, and a truck incorporating the same. The locking assembly includes a pressurized pin mechanism mounted on one of tailgate and the sidewall; and a spool mounted on the other of the tailgate and the sidewall. The spool is engageable with the pin mechanism to lock the locking assembly and secure the tailgate to the sidewall, and is disengageable from the pin mechanism to unlock the locking assembly and release the tailgate from its securement to the sidewall. A hinge assembly is provided on an opposite side of the tailgate from the locking assembly. The tailgate is selectively pivotable relative to the truck bed about a vertical axis extending through the hinge assembly or about a horizontal axis extending through both of the locking assembly and the hinge assembly.

18 Claims, 10 Drawing Sheets

PRESSURIZED LOCKING ASSEMBLY FOR A SIDE-SWING TAILGATE AND A TAILGATE INCORPORATING THE SAME

BACKGROUND OF THE INVENTION

1. Technical Field

This invention relates generally to vehicles. More particularly, this invention relates to trucks, especially dump trucks. Specifically, this invention is directed to a locking assembly for a side-swing tailgate for a dump truck where the locking assembly includes a pressurized pin.

2. Background Information

Dump trucks having tailgates which swing open about either of a horizontal axis or a vertical axis are known in the art. When the vehicle is not actively being used to dump a load it is necessary to be able to secure the tailgate to the truck bed. This is especially important when the vehicle is to travel over the roads. A variety of different locking or latching mechanisms have been disclosed in the art.

There is, however, always room in the art for an improved locking or latching assembly for securing truck tailgates.

SUMMARY

A locking assembly and method of securing a dump truck tailgate to a sidewall of the dump truck, and a truck incorporating the same. The locking assembly includes a pressurized pin mechanism mounted on one of tailgate and the sidewall; and a spool mounted on the other of the tailgate and the sidewall. The spool is engageable with the pin mechanism to lock the locking assembly and secure the tailgate to the sidewall, and is disengageable from the pin mechanism to unlock the locking assembly and release the tailgate from its securement to the sidewall. A hinge assembly is provided on an opposite side of the tailgate from the locking assembly. The tailgate is selectively pivotable relative to the truck bed about a vertical axis extending through the hinge assembly or about a horizontal axis extending through both of the locking assembly and the hinge assembly.

The method of engaging a tailgate to a trailer bed includes the steps of:
 providing a spool extending outwardly from a side edge of the tailgate;
 mounting a bracket to a sidewall of the bed; where the bracket includes at least a first arm and a second arm, and a first gap defined between the first and second arms;
 swinging the gate to a closed position so that the spool enters the first gap;
 actuating a pressurized cylinder to cause a piston rod to extend further outwardly therefrom;
 pivoting a pin linked to the piston rod;
 moving the pin upwardly through a first aperture defined in the second arm of the bracket;
 continuing the pin movement until the pin blocks off the first gap; and
 securing the spool in the first gap using the pin.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION

Figure 1:
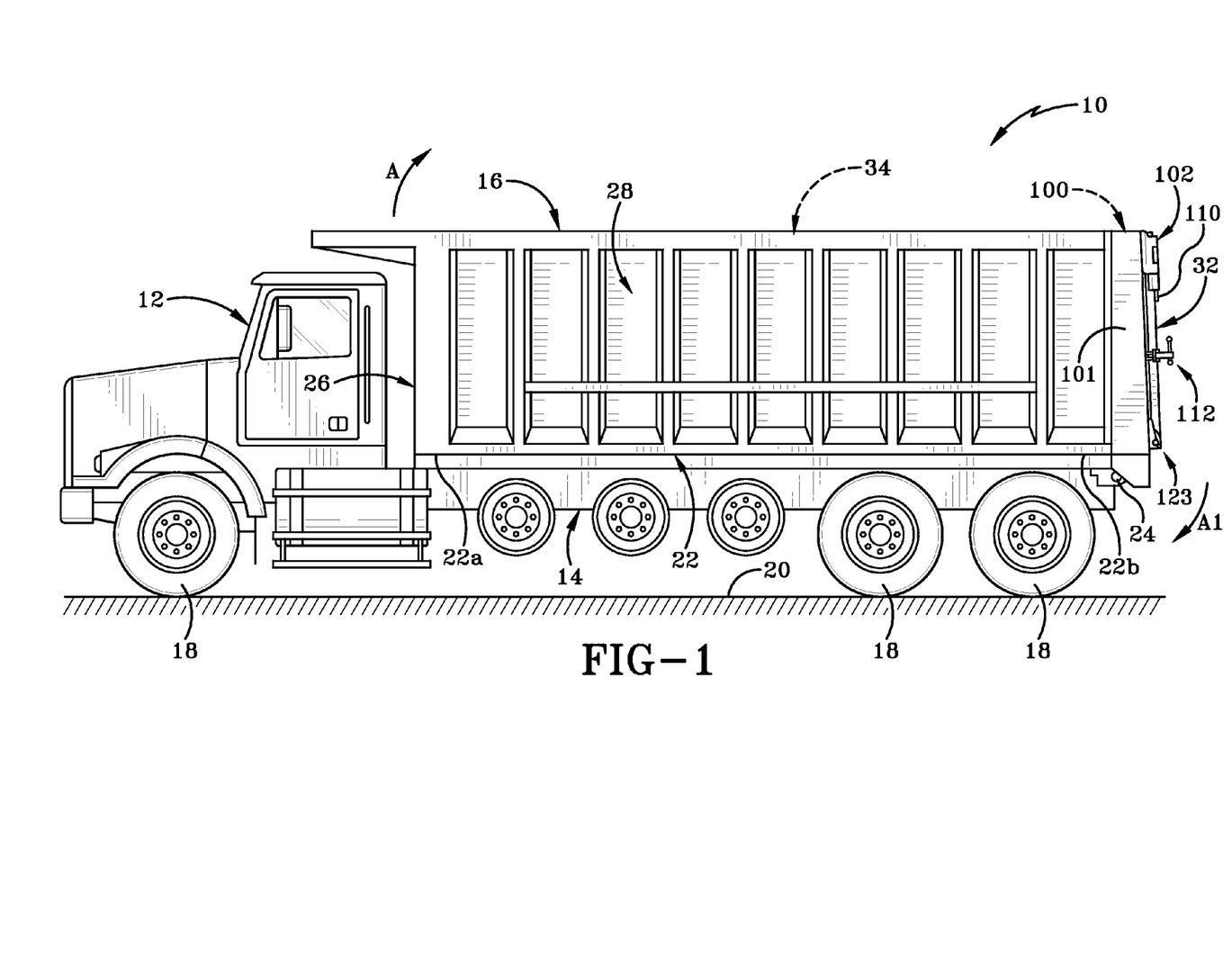
FIG. 1 is a side elevational view of a dump truck having a side-swing tailgate which includes a locking assembly.

Referring to FIG. 1 there is shown a dump truck 10 comprising a cab 12 mounted on a front region of a truck frame 14, and an open box bed 16 mounted on a rear region of the truck frame 14. A plurality of wheels 18 are engaged on frame 14 and are positioned to contact a road surface 20 over which the truck 10 is to travel.

Bed 16 is generally rectangular in shape includes a bottom wall 22 having a front end 22a and a rear end 22b. Rear end 22b is pivotally secured to frame 14 by a hinge 24. Although it is not illustrated herein, it will be understood that a hydraulic lift is mounted on frame 14 and engages front end 22a of bottom wall 22. The hydraulic lift is activatable to raise up the front end 22a of bottom wall 22 such that bottom wall 22 pivots about hinge 24 and becomes oriented at an angle relative to frame 14.

Bed 16 includes a front wall 26, a first sidewall 28, and a second sidewall 30 (FIG. 2), each of which extends upwardly at right angles from bottom wall 22 and is fixedly engaged therewith. Bottom wall 22, front wall 26, and first and second sidewalls 28, 30 bound and define a compartment 34. An opening to that compartment 34 is defined by the rear ends of first and second sidewalls 28, 30 and rear end 22b of bottom wall 22. A tailgate 32 is engaged with the rear ends of first and second sidewalls 28, 30 and extends across the opening to compartment 34. Tailgate 32 is engaged with the rear end of first sidewall 28 by a hinge assembly 99, a safety latch 112 and a latch mechanism 123. Tailgate 32 is engaged with the rear end of second sidewall 30 by a locking assembly 35 (FIGS. 4 and 5), and by a latch mechanism 93. All of these various securements will be further described herein.

Figure 2:
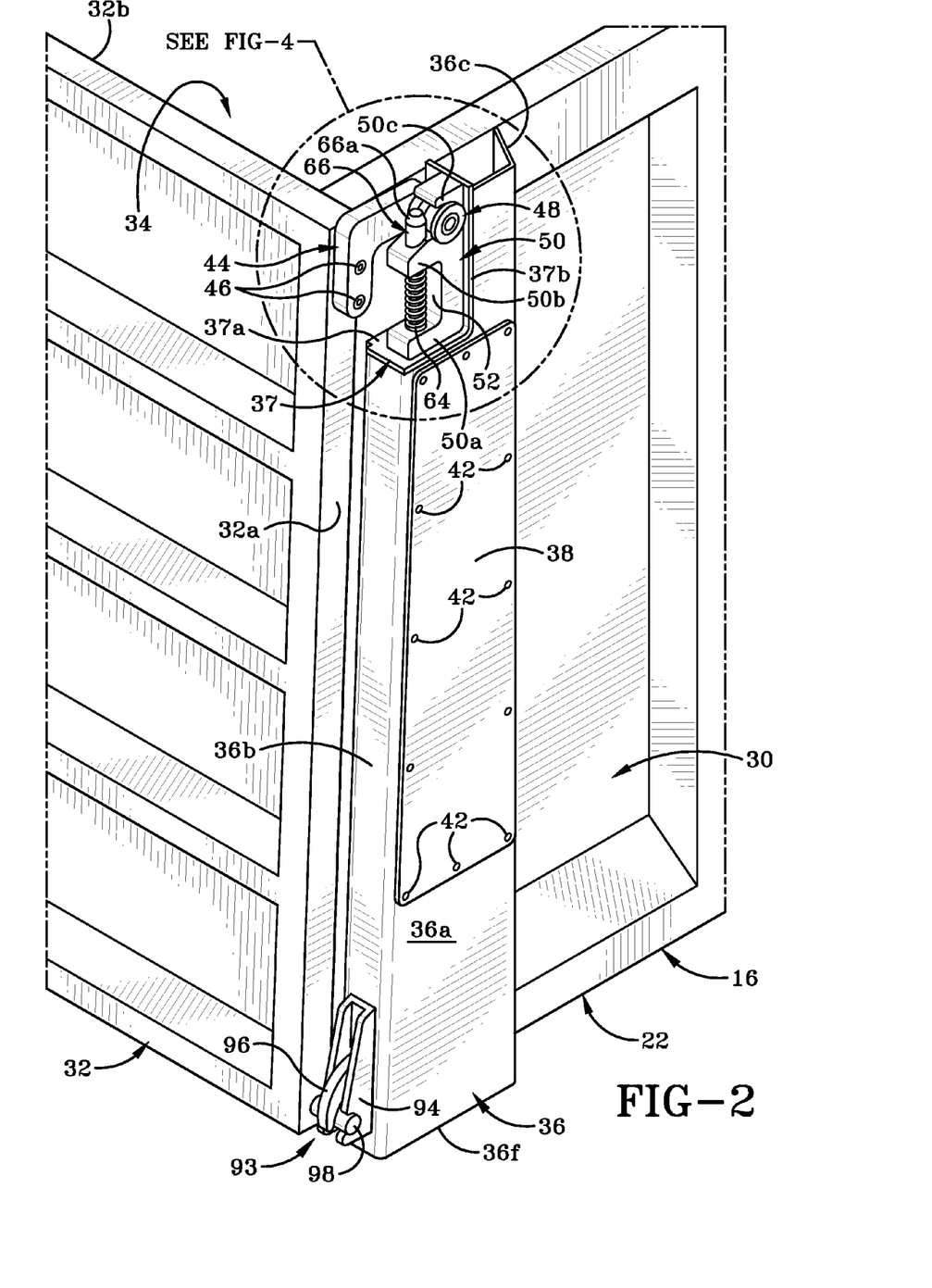
FIG. 2 is a rear perspective view of the back, right-hand corner of the truck showing the locking assembly mounted on the truck bed and engaged with the tailgate; and where the locking assembly is shown in a latched position.

FIG. 2 shows the right back corner of bed 16 showing a portion of tailgate 32 in a closed position adjacent the rear end of second sidewall 30. The portion of tailgate 32 is locked to second sidewall 30 by locking assembly 36. A housing 36 is fixedly mounted on second sidewall 30 by a suitable means, such as by welding. Housing 36 is generally U-shaped in cross-section and includes a sidewall 36a, a rear wall 36b and a front wall 36c. A cut-out (not numbered) is defined in portions of sidewall 36a and rear wall 36b proximate a top end of housing 36. An L-shaped bracket 37 is fixedly secured to housing 36 in this cut-out. Bracket 37 includes a first leg 37a and a second leg 37b which are disposed generally at right angles to each other and are welded to housing 36. A first opening 36d (FIG. 7) and a second opening 36e are defined in sidewall 36a of housing 36. First opening 36d begins proximate bracket 37 and extends downwardly for a distance towards a bottom end 36f of housing 36. A removable faceplate 38 is positioned over first and second openings 36d, 36e and is secured to sidewall 36a by way of a plurality of fasteners 42. When housing 36 is mounted on second sidewall 30, a chamber 40 (FIGS. 4 & 5) is defined between housing 36 and second sidewall 30. Faceplate 38 is removable to gain access through first and second openings 36d, 36e into chamber 40 for maintenance of various components of locking assembly 35 housed within chamber 40 as will be later described herein.

Figure 4:
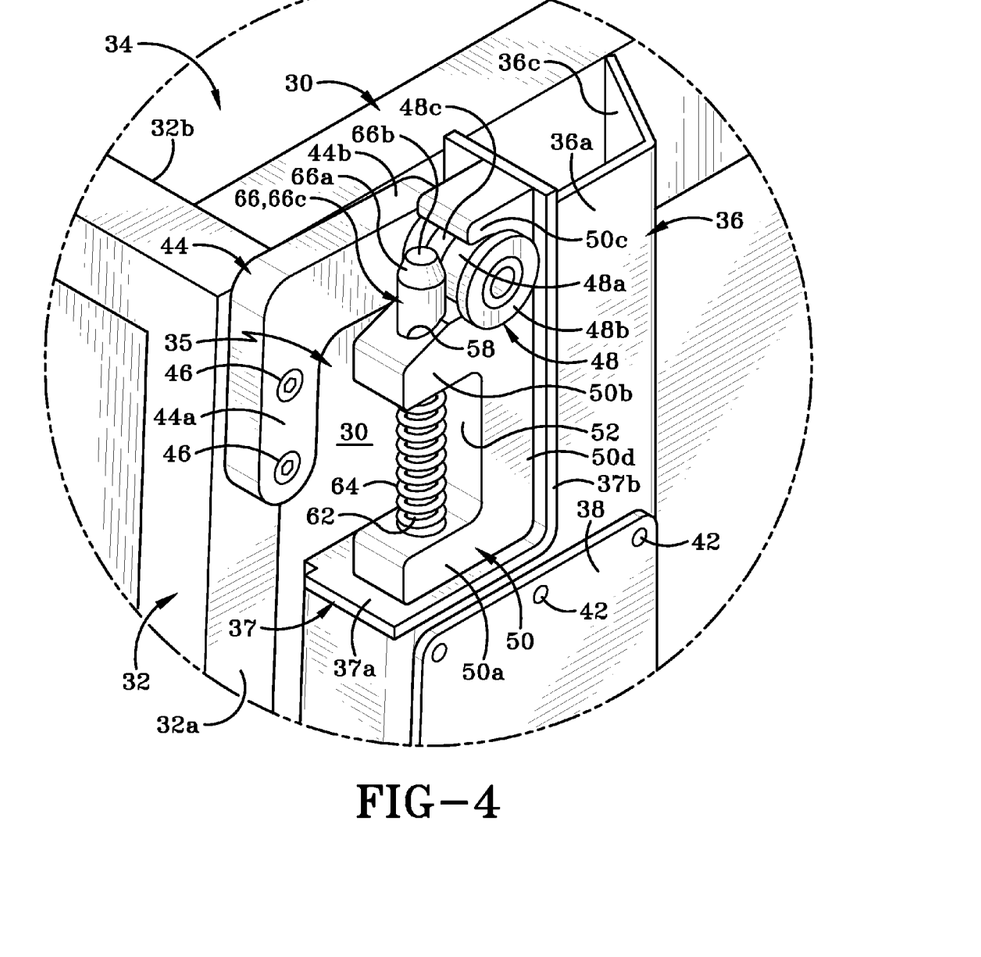
FIG. 4 is an enlarged rear perspective view of the highlighted region of FIG. 2.
Figure 7:
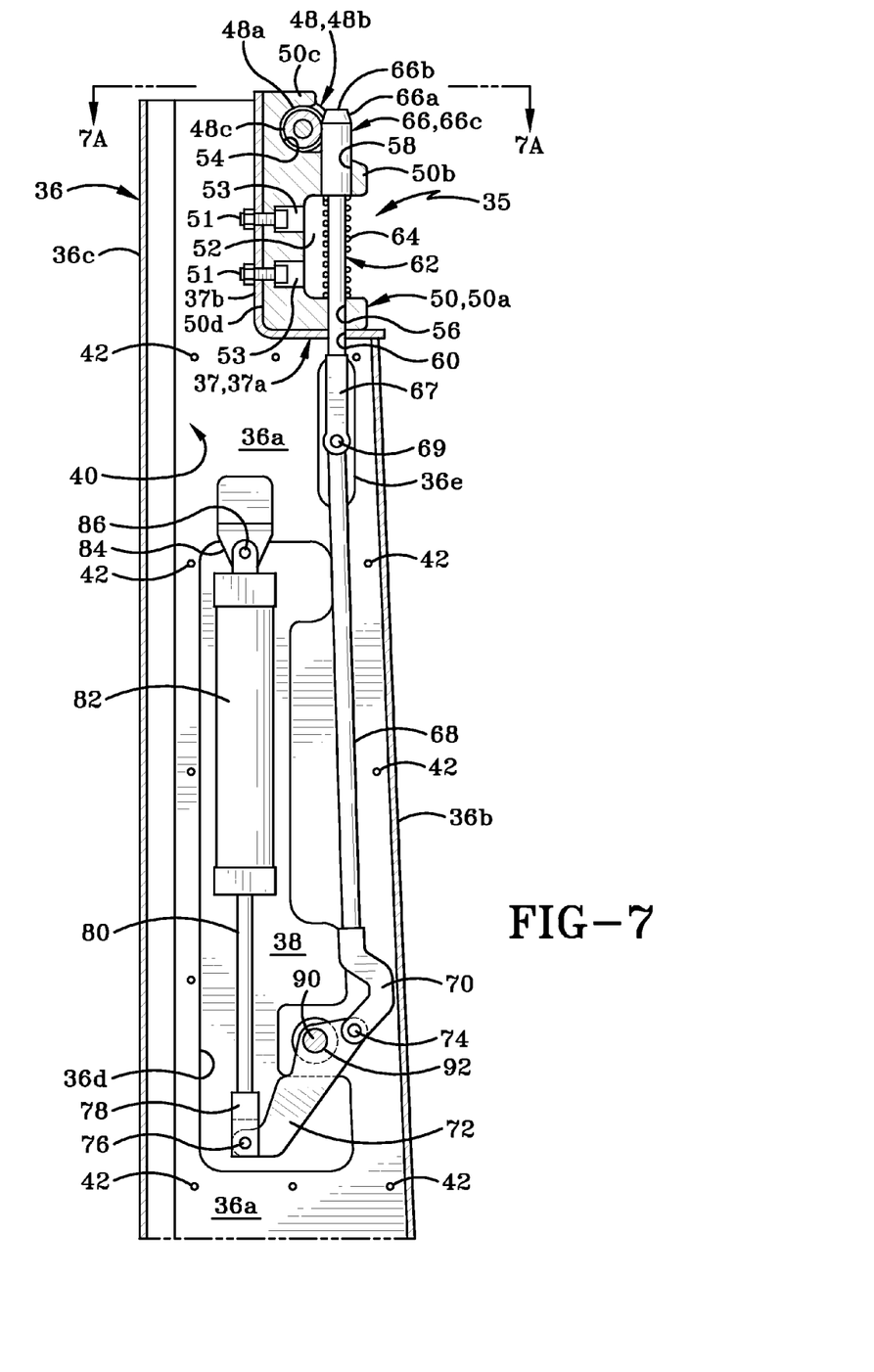
FIG. 7 is a left side cross-sectional view of the locking assembly and the portion of the tailgate, with the locking assembly in the latched position.
Figure 7A:
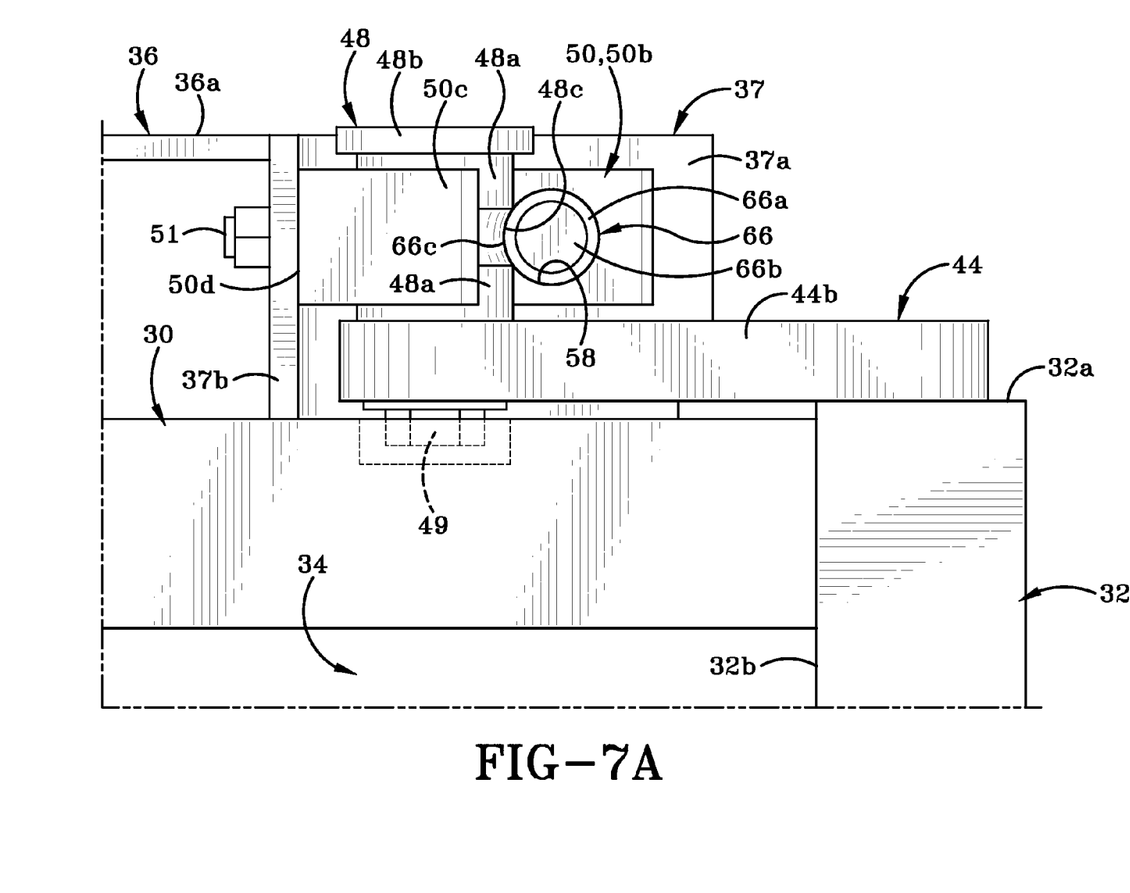
FIG. 7A is a top view of the locking assembly taken along line 7A-7A of FIG. 7.

Referring to FIGS. 4 and 7A, locking assembly 35 includes a generally L-shaped mounting block 44 which is fixedly secured to first side edge 32a of tailgate 32. Mounting block 44 includes a first leg 44a and a second leg 44b that are disposed generally at right angles to each other. Although not illustrated herein, mounting block 44 preferably includes a protrusion which extends outwardly from first leg 44a and is received into a complementary recess in first side edge 32a of tailgate 32. A plurality of fasteners 46 (FIG. 2) extend through first leg 44a and into first side edge 32a of tailgate 32. A spool 48 extends outwardly, at right angles, from an exterior surface of second leg 44b of mounting block 44. Spool 48 is thus disposed generally parallel to interior surface 32b of tailgate 32 and is spaced a distance forwardly away therefrom. Spool 48 is secured to second leg 44b by a bolt 49 and is configured to be able to rotate around an axis which extends through bolt 49. Although not illustrated herein, it will be understood that spool 48 is provided with bearings to aid it in rotating freely. Spool 48 is generally cylindrical in shape and includes a first region 48a of a first diameter and a second region 48b of a second diameter, with the second diameter being greater than the first. First region 48a originates proximate second leg 44b and extends for a distance outwardly therefrom. Second region 48b is disposed toward a free end of spool 48 and is thus spaced from second leg 44b. Spool further includes an annular groove 48c (FIGS. 4 and 7A) which is defined within first region 48a and is of a third diameter. The third diameter is less than the first diameter. As best seen in FIG. 7A, groove 48c is curved across its width and the reason for this curvature will be further disclosed herein.

Locking mechanism 35 further includes a generally E-shaped bracket 50 (FIGS. 2, 4 & 5) which is mounted to L-shaped bracket 37 on housing 36. Bracket 50 includes a first, a second and a third arm 50a, 50b, 50c which extend outwardly from a base 50d. First and second arms 50a, 50b are of generally the same length but first arm 50c is shorter and terminates a distance inwardly from the free ends of first and second arms 50a, 50b. A second gap 52 is defined between the first and second arms 50a, 50b, and a first gap 54 (FIG. 8) is defined between second and third arms 50b, 50c. First gap 54 preferably is of a width that is smaller than the width of second gap 56. In particular, the width of first gap 54 is substantially equal to the first diameter of first region 48a of spool 48.

When bracket 50 is engaged with housing 36, third arm 50a is positioned adjacent an exterior surface of first leg 37a of bracket 37, and base 50d of bracket 50 is positioned adjacent an exterior surface of second leg 37b of bracket 37. A plurality of fasteners 51 (FIG. 7) is used to secure base 50d to second leg 37b. Preferably, each fastener 51 is recessed into an associated hole 53 defined within base 50d of bracket 50.

Referring to FIG. 7, a first aperture 56 is defined in third arm 50a and a second aperture 58 is defined in second arm 50b. First and second apertures 56, 58 are disposed generally parallel to base 50d of bracket 50 and are generally aligned with each other. A hole 60 is defined in first leg 37a of bracket 37. When bracket 50 is mounted on bracket 37, first aperture 56 in bracket 50 is vertically aligned with hole 60 in bracket 37. Hole 60 and first aperture 56 are of substantially the same diameter. Second aperture 58 is of a greater diameter than that of hole 60 and first aperture 56.

In accordance with another feature of the present invention, locking assembly 35 further includes a pin 62 which extends through hole 60 and through first aperture 56. Pin 62 has an upper end and a lower end. The upper end of pin 62 passes through a bore of a spiral spring 64 positioned within the second gap 52 defined between first and second arms 50a, 50b of bracket 50. A cap 66 is engaged with the upper end of pin 62. Cap has a beveled surface 66a, a top end 66b and an outer wall 66c. Wall 66c is of generally the same diameter as second aperture 58 and is able to move therethrough. The diameter of wall 66c is such that it cap 66 is unable to move through either of first aperture 56 or hole 60. Cap 66 includes a beveled surface 66a (FIG. 4), a top end 66b and a side surface 66c. Beveled surface 66a extends between top end 66b and side surface 66c and is disposed at an angle relative thereto. Cap 66 and spring 64 substantially prevent pin 62 from being withdrawn through first aperture 56 and hole 60 and into the interior chamber 40 of housing 36 during operation of locking assembly 35.

Figure 5:
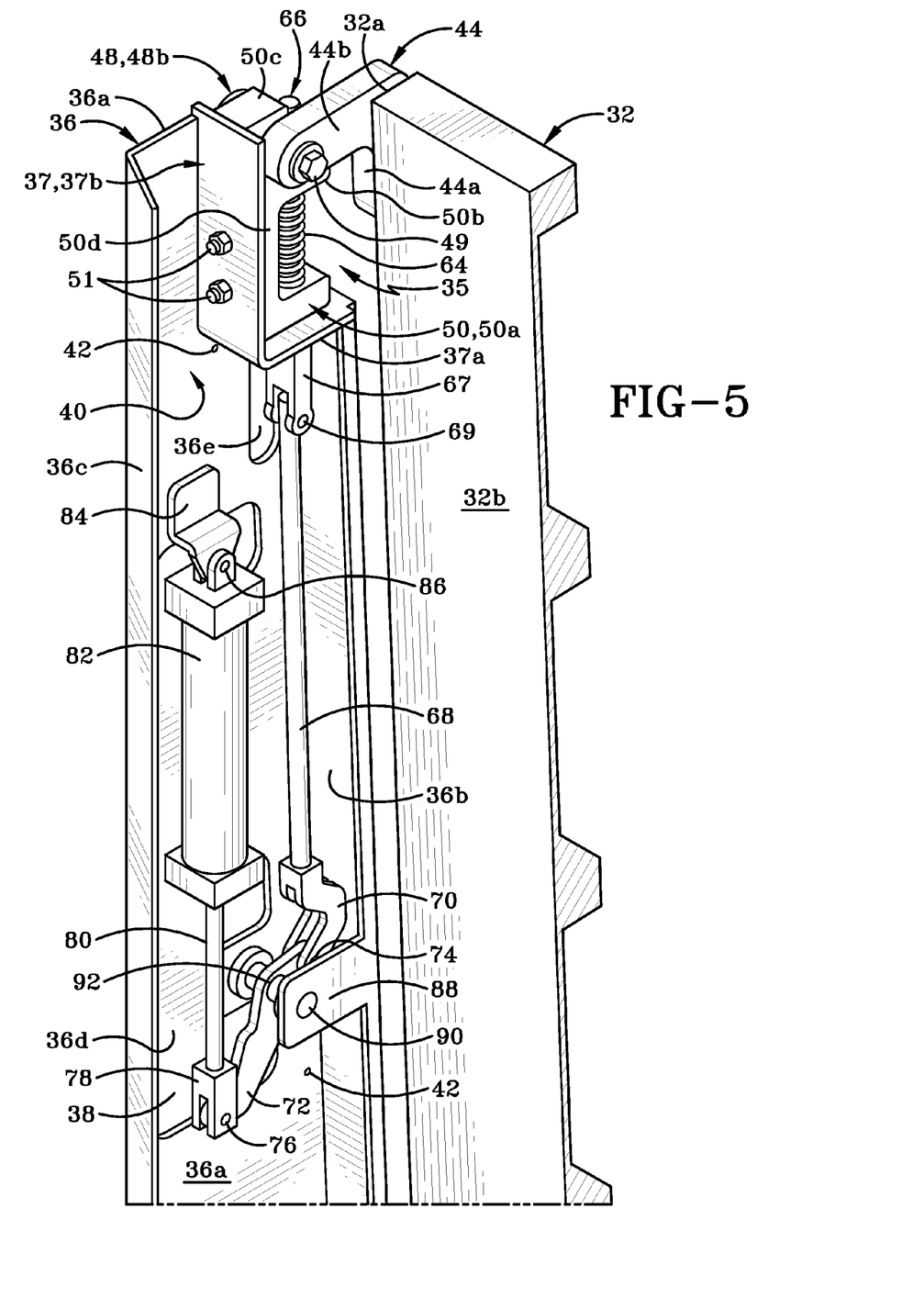
FIG. 5 is a front perspective view of the locking assembly (with the truck bed wall removed) and a portion of the tailgate engaged with the locking assembly, and showing the locking assembly in the latched position.

Locking assembly 35 further includes a collar 67 which is engaged with the lower end of pin 62 in a location such that when the cap 66 and upper end of pin 62 are received in bracket 50, the collar 67 is positioned within chamber 40 a distance vertically beneath first leg 37a of bracket 37. Collar 67 is of a width that is greater than the diameter of hole 60. Collar 67 cannot pass through hole 60 and thus acts as a stop to limit the travel of pin 62 through bracket 50. A first pivot pin 69 secures collar 67 to an upper end of a linkage arm 68. A hook 70 is fixedly engaged with a lower end of linkage arm 68 and hook 70 is, in turn engaged with a connector bracket 72 by way of a second pivot pin 74. The opposite end of connector bracket 72 is engaged by way of a third pivot pin 76 to a collar 78. Collar 78 is fixedly engaged with a piston rod 80 of a pneumatic cylinder 82. Cylinder 82 is secured to a mounting bracket 84 by a fourth pivot 86. Bracket 84 is fixedly secured to an interior surface of housing 36. FIG. 5 shows that a flange 88 extends outwardly from housing 36 and a shaft 90 extends outwardly therefrom and through an aperture 92 (FIG. 7) in connector bracket 72. Linkage arm 68, connector bracket 72, collar 78, piston rod 80 and pneumatic cylinder 82 and their connector components all form part of locking assembly 35.

It will be understood that instead of cylinder 82 being a pneumatic cylinder, it may alternatively be a hydraulic cylinder. It will be further understood that cylinder 82 is operatively connected to an activation assembly (not shown) that may be directly or remotely activated by the operator. When cylinder 82 is activated in a first instance the piston rod 80 is moved in a first direction relative to cylinder 82 and this movement in turn causes movement of pin 62. When cylinder 82 is activated in a second instance, the piston rod 80 is moved in a second direction relative to cylinder 82 and this movement again results in the pin 62 being moved. Locking assembly 35 is movable between a locked position and an unlocked position. In the locked position, tailgate 32 is held adjacent the rear end of second sidewall 30 and is prevented from moving away therefrom. In the unlocked position, the tailgate 32 is free to move toward and away from the rear end of second sidewall 30. The operation of locking assembly 35 and the manner in which it is moved between the locked and unlocked positions will be later described herein.

As indicated previously, tailgate 32 is also secured to second sidewall 30 by a latch mechanism 93. Latch mechanism 93 is provided proximate bottom end 36f of housing 36. As shown in FIG. 2, latch mechanism 93 includes a mounting bracket 94 fixedly secured to rear side 36b of housing 36, proximate bottom end 36f thereof, and a latch 96 which is pivotally mounted within bracket 94. Latch mechanism 93 is operable to engage a latch pin 98 which extends outwardly from a bottom region of the first side edge 32a of tailgate 32. When latch pin 98 is received within a recessed region defined by mounting bracket 94 and is retained therein by latch 96, latch mechanism 93 is in the latched position. In this latched position, latch mechanism 93 retains the bottom region of tailgate 32 in close proximity to bottom wall 22 on bed 16. In order to move latch mechanism 93 to an unlatched position, latch 96 is lifted manually and rotated upwardly out of engagement with latch pin 98 and tailgate 32 is pulled a short distance outwardly away from second sidewall 30 so that latch pin 98 will come to rest on the exterior surface of latch 96 when tailgate 32 is released. An operator will manually move latch mechanism 93 to the unlatched position prior to dumping a load or prior to swinging tailgate 32 open away from second sidewall 30.

Figure 3:
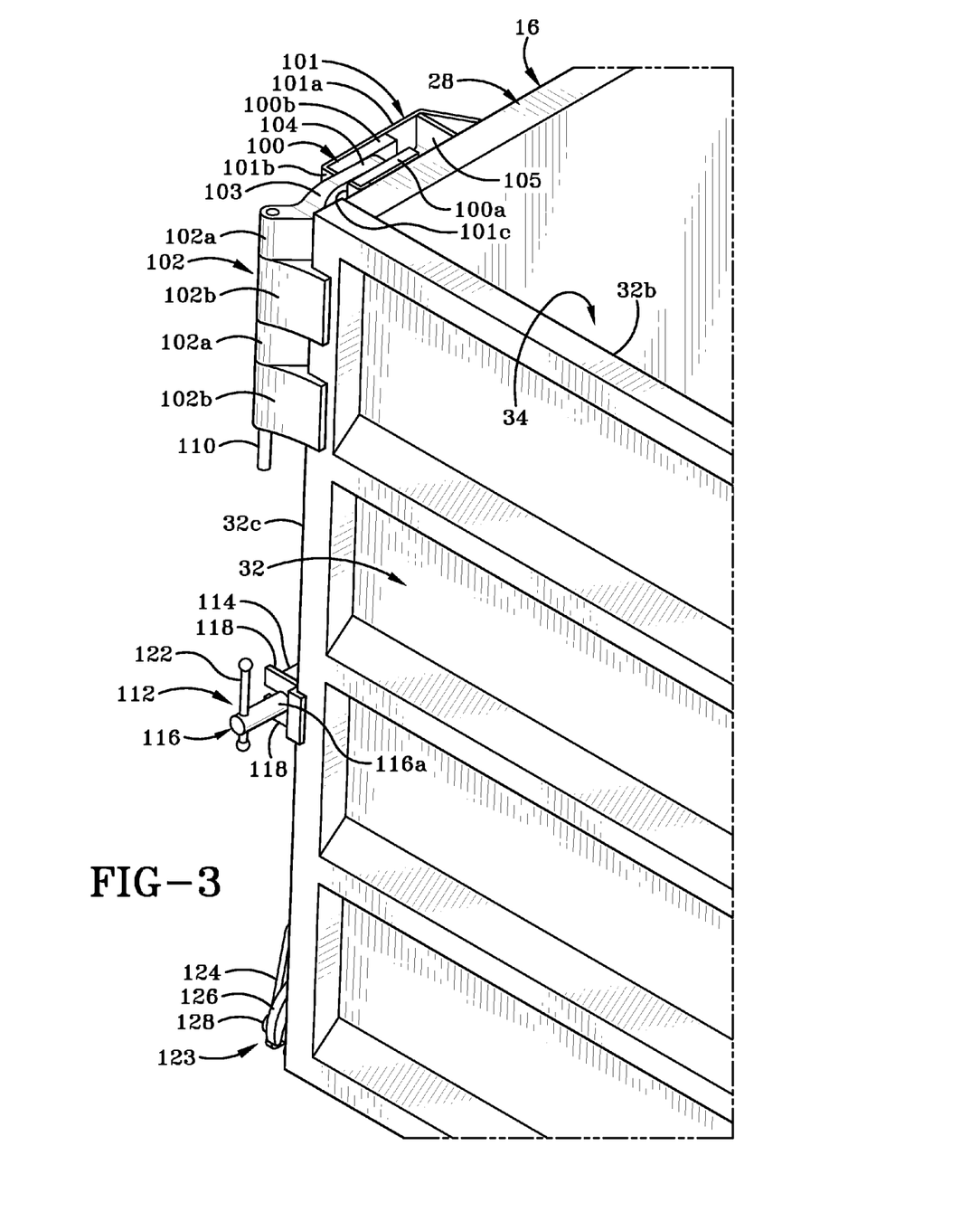
FIG. 3 is a rear perspective view of the back, left-hand corner of the truck showing a hinge assembly engaged with the truck bed and the tailgate.
Figure 6:
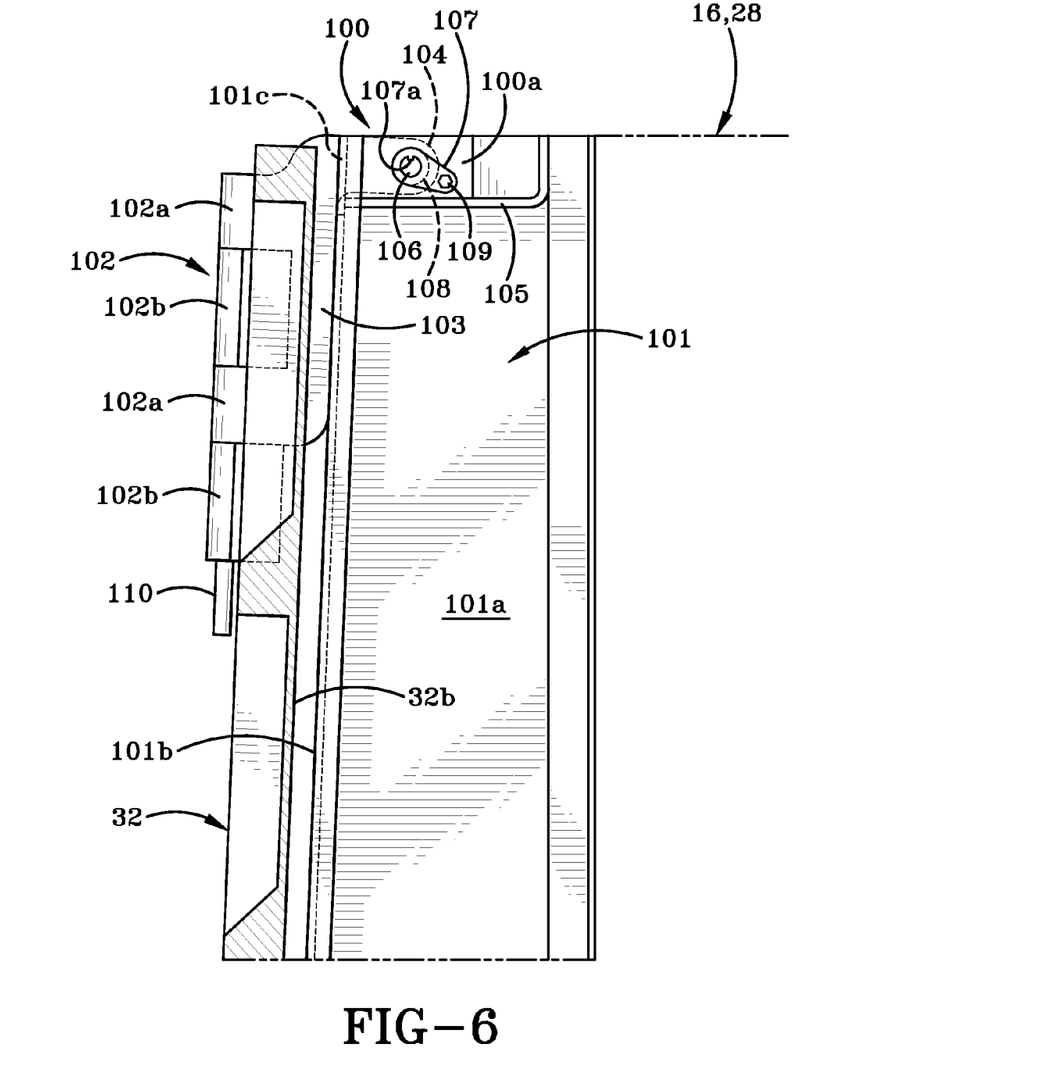
FIG. 6 is a right side view of the hinge assembly, the left-side wall of the truck bed and a portion of the tailgate engaged with the hinge assembly.

Referring to FIGS. 3 & 6, as indicated previously hinge assembly 99 engages an upper region of tailgate 32 to first sidewall 28. A housing 101 that is substantially identical in shape to housing 36 is mounted to an exterior surface of first sidewall 28 adjacent the rear end thereof. Housing 101 includes a sidewall 101a and a rear wall 101b. Housing 101 defines a cut-out in sidewall 101a and rear wall 101b in a region proximate the upper end of housing 101. An L-shaped bracket 105 is welded to housing in this cut-out in much the same way as bracket 37 is welded to housing 36. A vertical slot 101c (FIG. 3) is defined in the upper end of rear wall 101b. Slot 101c terminates adjacent an upper surface of bracket 105.

Figure 9:
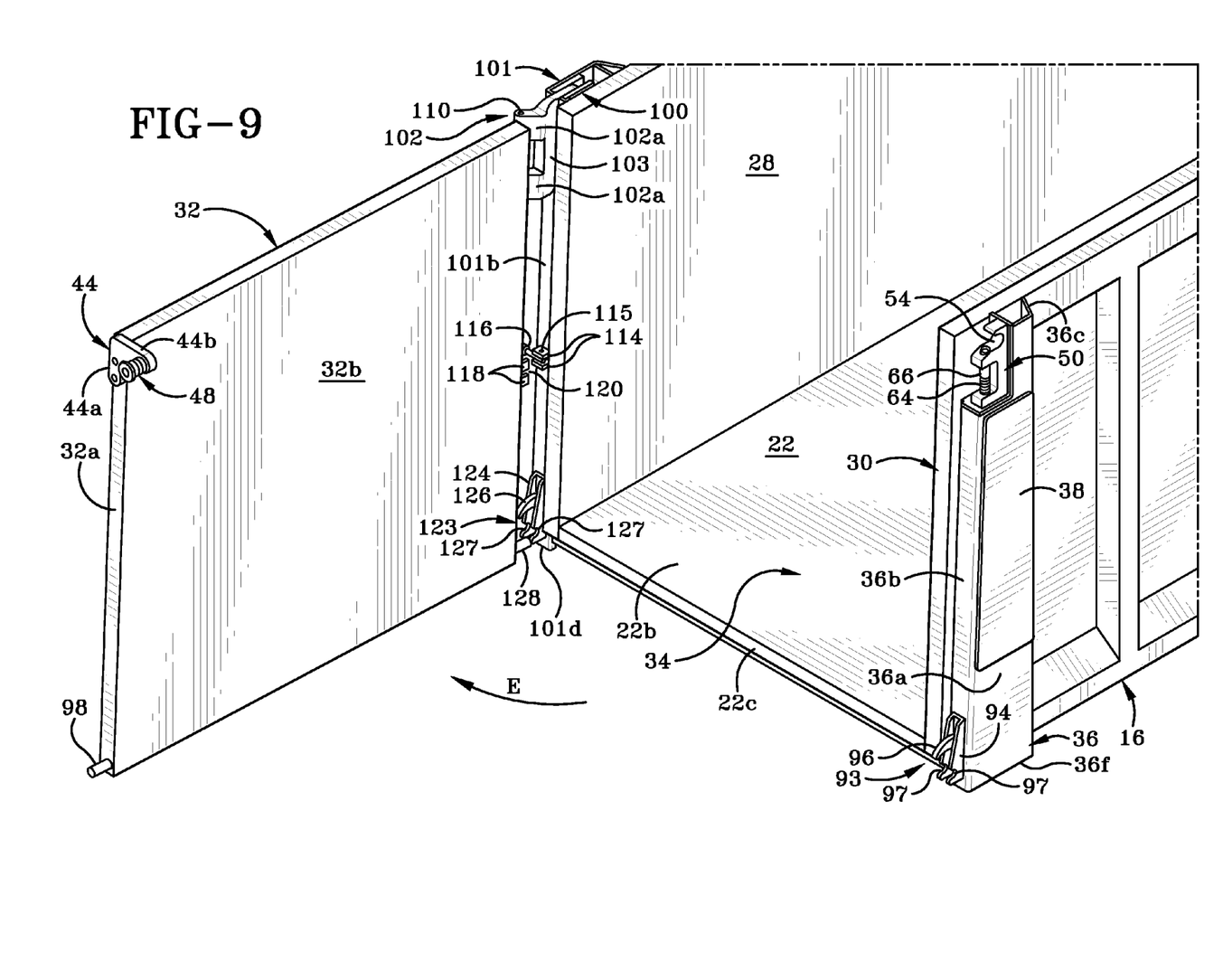
FIG. 9 is a rear perspective view of the truck bed with the tailgate swung into an open position.

Hinge assembly 99 includes a hinge support 100 comprising first and second support plates 100a, 100b. Hinge support plates 100a, 100b are disposed within a cavity (not numbered) defined between housing and first sidewall 28. Specifically, hinge support plates 100a, 100b are disposed on either side of slot 101c and extend forward for a distance within housing 101. Hinge assembly 99 further includes a hinge 102. Hinge 102 includes first knuckles 102a and second knuckles 102b which are linked together by a hinge pin 110 (which passes through aligned apertures in first and second knuckles 102a, 102b). As shown in FIG. 9, first knuckles 102a extend outwardly from a leaf 103 which is fixedly secured to first sidewall 28 of trailer bed 16. Second knuckles 102b are fixedly secured to tailgate 32. A flange 104 extends outwardly from the top front edge of leaf 103 and is received through slot 101c of housing 101 and between hinge support plates 100a, 100b. A shaft 106 (FIG. 6) extends outwardly from first sidewall 28 and is received through an aperture (not numbered) in flange 104. A link plate 107 is secured to one of the exterior surface of first sidewall 28, first hinge plate 100a or second hinge plate 100b by way of a fastener 109. Link plate 107 includes a detent 107a which is received in a slot (not numbered) in shaft 106. Link plate 107 thereby locks shaft 106 in a specific orientation relative to flange 104. Roller bearings 108 are provided around shaft 106 to ensure smooth operation of hinge assembly 99.

As indicated previously, a safety latch 112 engages tailgate 32 and first sidewall 28. FIG. 9 shows that safety latch 112 includes a pair of spaced apart mounting brackets 114 fixedly secured to first sidewall 28. A pin 116 is pivotally engaged with mounting brackets 114 by way of a pivot rod 115 which extends vertically through brackets 114. Pin 116 is able to pivot about a vertical axis which extends through pivot rod 115. A pair of flanges 118 is fixedly secured to second side edge 32c of tailgate 32. A gap 120 is defined between flanges 118 and this gap is complementary is size to pin 116. Pin 116 is received into gap 120 when tailgate 32 is moved into a closed position (such as is illustrated in FIG. 3). A handle 122 on pin 116 is rotated to threadably advance a sleeve 116a on pin 116 toward flanges 118 and thereby clampingly engage the same. When safety latch 112 is in this configuration, it is in a secured position. When it is desired to open tailgate 32, handle 122 is rotated in the opposite direction to disengage pin 116 from flanges 118, pin 116 may then be rotated about the pivot rod 115 to withdraw it from gap 120 and thereby release tailgate 32 from its engagement with first sidewall 28. When safety latch 112 is in this configuration, it is in an unsecured position.

As indicated previously tailgate 32 is also securable to first sidewall 28 by a latch mechanism 123. Latch mechanism 123 includes a mounting bracket 124 which is fixedly secured to rear wall 101b of housing 101 proximate bottom end 101d thereof. A latch 126 is pivotally mounted within bracket 124 and is operable to engage a latch pin 128 which extends outwardly from a bottom region of the second side edge 32c of tailgate 32. Latch mechanism 123 functions in substantially the same manner as latch mechanism 93.

Locking assembly 35 is used in the following manner. If one presumes tailgate 32 is in the closed and locked position (FIGS. 4, 5, and 7), then locking assembly 35 is in the locked position, latch mechanisms 93 and 123 are in the latched position, and safety latch 112 is in the secured position. Tailgate 32 is retained against the rear ends of first and second sidewalls 28, 30 and access to the opening to compartment 34 is prevented.

If the tailgate 32 is to be configured to permit the dump truck 10 to dump a load out of compartment 34 by tilting bed 16, the operator will first move safety latch 112 to the unsecured position (shown in FIG. 9) and will move latch mechanisms 93, 123 to the unlatched position. (It will be understood that both safety latch 112 and latch mechanisms 93, 123 are moved manually to the unsecured and unlatched positions by the operator.) The locking assembly 35 remains in the locked position where spool 48 is disposed within first gap 54 of bracket 50 and pin 62 with cap 66 thereon is in its fully extended position where it projects into first gap 54. In this fully extended position, cap 66 rests in groove 48c of spool 48 and keeps spool 48 in contact with the interior wall of bracket 50 which defines first gap 54. (FIG. 7A illustrates the engagement of cap 66 and spool 48 and shows the curved outer surface 66c of cap 66 at least partially seated in the complementary curved groove 48c of spool 48.) The engagement of cap 66 with spool 48 substantially prevents spool 48 from exiting first gap 54. Thus, spool 48 is locked to bracket 50 and, consequently, tailgate 32 is locked to second sidewall 30. When tailgate 32 is in this position, it is possible for the operator to engage an activation assembly (not shown) and thereby cause a hydraulic lift (not shown) to raise the front end of trailer 16 in the direction of arrow "A" (FIG. 1) and thereby angle bed 16. As the hydraulic lift moves front end 22a of bottom wall 22 upwardly in the direction of arrow "A" (FIG. 1), bed 16 pivots about hinge 24 at rear end 22b in the direction indicated by arrow "A1". This motion causes any load retained within compartment 34 to slide rearwardly toward tailgate 32. While bed 16 tilts, tailgate 32 remains hanging substantially vertically. This is made possible by tailgate 32 pivoting about a horizontal axis which extends through shaft 106 in hinge assembly 102 and through spool 48 in locking assembly 35. (It will be understood that shaft 106 and spool 48 are horizontally aligned with each other and are located vertically at substantially the same position on first and second sidewalls 28, 30.) The relative motion between bed 16 and tailgate 32 opens up a gap between the rear end of bottom wall 22 and the bottom 32d of tailgate 32. Thus, the load within bed 16 slides through the gap and onto the road surface upon which truck 10 rests.

When the dumping operation is over, the front end of bed 16 is lowered toward frame 14 by deactivating the hydraulic lift. Bed 16 pivots in the opposite direction to arrow "A" (FIG. 1) and returns to its original position shown in FIG. 1. When pins 98, 128 contact latches 96, 126 of latching mechanisms 93, 123, they depress the same inwardly automatically and slide down the curved surfaces thereof until they come to rest in the recesses 97, 127. At this point latches 96, 126 slide past pins 98, 128, respectively, and come to rest on an exterior surface thereof, thus locking pins 98, 128 within locking mechanisms 93, 123. The operator will then manually re-engage safety latch 112 and the truck 10 is ready to drive on road 20 once again.

Figure 8:
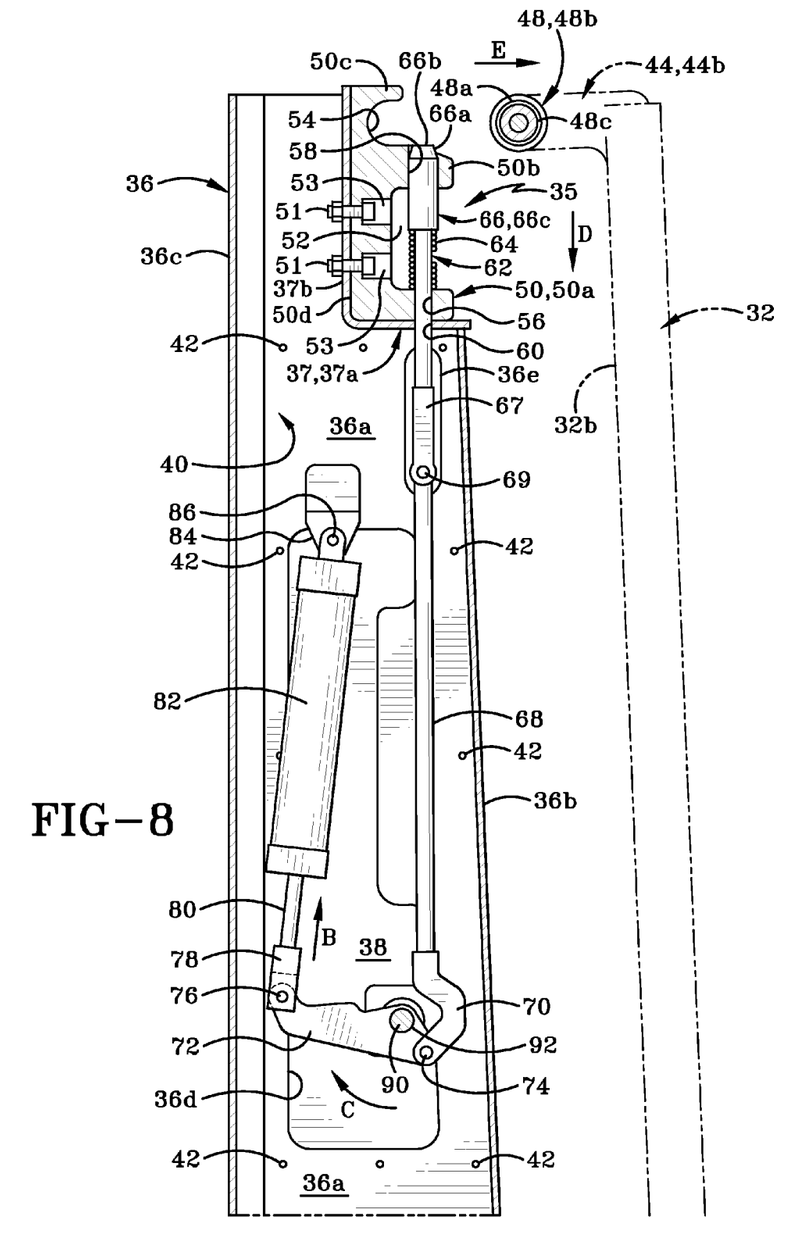
FIG. 8 is a left side cross-sectional view of the locking assembly and the portion of the tailgate, with the locking assembly in an unlatched position.

If, on the other hand, the operator wishes to access the load in compartment 34 without dumping the same, he or she will move safety latch to the unsecured position as previously described and will also unlatch latch mechanisms 93, 123 as previously described. In order to swing tailgate 32 open about a vertical axis which extends through hinge assembly 102, the operator must also unlock locking mechanism 35. In order to do this the operator must engage an activation assembly (not shown) which will activate hydraulic cylinder 82. Referring to FIG. 8, the activation of hydraulic cylinder 82 causes piston rod 80 to be withdrawn into cylinder 82 in the direction of arrow "B". The decrease in length of piston rod 80 causes connector bracket 72 to rotate about second pivot pin 74 in the direction of arrow "C". The rotation of connector bracket 72 causes linkage arm 68 and therefore pin 62 to be drawn downwardly through bracket 50 in the direction of arrow "D". Pin 62 is moved downwardly through bracket 50 until it no longer obstructs gap 54 in bracket 50. This positioning of pin 62 coincides with the underside of cap 66 compressing spring 64 to such a degree that no further downward motion of pin 62 is possible. Once cap 66 no longer obstructs first gap 54, spool 48 is free to slide out of the same. At this point, locking mechanism 35 is in an unlocked position and tailgate 32 is effectively released from its engagement with second sidewall 30. The operator is then able to manually grasp tailgate 32 and rotate it to an open position. As tailgate 32 begins to rotate about the vertical axis extending through hinge pin 110, spool 48 slides out of first gap 54 of bracket 50 and in the direction indicated by arrow "E". Tailgate 32 is swung open in the direction indicated by arrow "F" in FIG. 9 and the operator is then able to access the interior of compartment 34 of bed 16.

When the operator wishes to close tailgate 32, the tailgate 32 is pivoted about hinge pin 110 in the opposite direction to arrow "F". When first side edge 32a of tailgate 32 approaches second sidewall 30, spool 48 slides into first gap 54 of bracket 50 in a direction opposite to arrow "E" (FIG. 8). Latch mechanisms 93, 123 will also automatically move to a latched position as pins 98 and 128 engage the same as previously described. When spool 48 is seated in first gap 54, the operator will actuate cylinder 82 once again. This causes piston rod 80 to move in the opposite direction to arrow "B" so that an increased length of piston rod 80 extends outwardly from cylinder 82. This motion in turn causes connector bracket 72 to pivot about third pivot pin 76 in a direction opposite to arrow "C". The motion of connector bracket 72 in this direction causes linkage arm 68 and therefore pin 62 to move upwardly in the opposite direction to arrow "D". Additionally, the previously compressed spring 64 returns to its original shape and as it does so, it urges pin 62 upwardly through second arm 50b. As pin 62 moves upwardly, beveled surface 66a on cap 66 of pin 62 engages the exterior surface of spool 48 and urges the same further into first gap 54. Outer surface 66c of cap 66 enters groove 48c on spool 48 and thereby locks cap 66 against lateral sliding motion on spool 48. When piston rod 80 reaches its maximum extension out of cylinder 32, pin 62 is in a position where top end 66b of cap 66 is generally flush or close to a bottom surface of first arm 50c. Cap 66 of pin 62 obstructs enough of the opening to first gap 54 to prevent spool 48 from exiting therefrom. At this point, locking mechanism 35 is in the locked position and tailgate 32 is thus secured to second sidewall 30. Since latch mechanisms 93, 123 are also latched at this point; tailgate 32 is secured at both its top end and bottom end to first and second sidewalls 28, 30 of bed 16. The operator will then manually re-engage safety latch 112 to ensure that latch mechanisms 93, 123 will not accidentally disengage during movement of truck 10.

It will be understood that while the tailgate 32 has been illustrated herein as being able to be swing open from right to left, it may alternatively be configured to swing open from left to right. If this is the case the locking assembly 35 will be engaged with first sidewall 28 and hinge assembly 102 will be engaged with second sidewall 30. The latch mechanisms 93, 123 will remain in the same location, no matter which way tailgate 32 opens. Security latch 112 preferably will be moved to the first side edge 32a of tailgate 32 from second side edge 32c thereof. Still further, a second security latch 112 may be provided on tailgate 32 on the other of the first and second side edges 32a, 32c.

It will further be understood that while it has been disclosed that locking assembly 35 is mounted on second sidewall 30 and that the spool 48 is mounted on tailgate 32, the locking assembly 35 may instead be mounted on tailgate 32 and the spool 48 may be mounted on second sidewall 35. Similarly, the various hinge assembly components may be mounted on the opposite one of the tailgate 32 and first sidewall 28 from that illustrated and described herein.

Still further, while the housing 36 and pressurized pin mechanism (bracket 50, pin 62 and hydraulic cylinder 82 and all intermediate components) are disclosed as being mounted on the exterior surface of second sidewall 30, the housing and pressurized pin mechanism may alternatively be mounted on the interior surface of second sidewall 30. Similarly, if the housing and pressurized pin mechanism are mounted on the tailgate instead of on one of the first and second sidewalls, they may be mounted on either of the interior and exterior surfaces of the tailgate.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A dump truck comprising:
a truck bed having a bottom wall, a front wall, and first and second sidewalls extending upwardly from the bottom wall;
a compartment defined by the bottom, front, first and second sidewalls; said compartment having an opening defined between a rear end of the first sidewall and a rear end of the second sidewall;
a tailgate spanning the opening, said tailgate being movable between an open position and a closed position;
a locking assembly engaging a first region of the bed with a first region of the tailgate when the tailgate is in the closed position, said locking assembly including:
a spool provided on the first region of the bed or the first region of the tailgate;
a bracket provided on the other of the first region of the bed or the first region of the tailgate, wherein the bracket includes a first arm and a second arm;
a gap defined between inner surfaces of the first and second arms and oriented along a first axis; wherein the spool is received in the gap when the tailgate is moved to the closed position;
an aperture defined in the second arm of the bracket; the aperture being oriented along a second axis, where the second axis is oriented at right angles to the gap; and
a pin aligned along the second axis and being movable along the second axis through the aperture between a locked position where the pin extends into the gap and an unlocked position where the pin does not extend into the gap.

2. The dump truck as defined in claim 1, wherein the locking assembly includes a pressurized cylinder operatively engaged with the pin, and the cylinder is activated to move the pin in one of a first direction and a second direction along the second axis and between the locked position and the unlocked position.

3. The dump truck as defined in claim 2, further comprising a hinge assembly engaging a second region of the bed with a second region of the tailgate; and wherein the tailgate is selectively pivotable relative to the bed about a vertical axis extending through the hinge assembly or about a horizontal axis extending through both of the locking assembly and the hinge assembly; wherein the locking assembly is moved to the unlocked position before the tailgate is pivoted about the one of the vertical axis or the horizontal axis extending through the hinge assembly.

4. A dump truck comprising:
a truck bed having a bottom wall, a front wall, and first and second sidewalls extending upwardly from the bottom wall;
a compartment defined by the bottom, front, first and second sidewalls; said compartment having an opening defined between a rear end of the first sidewall and a rear end of the second sidewall;
a tailgate spanning the opening;
a locking assembly engaging a first region of the bed with a first region of the tailgate; wherein the locking assembly comprises:
a pressurized pin mechanism mounted on one of the first and second sidewalls of the truck bed or the tailgate; and
a spool mounted on the other of one of the first and second sidewalls of the truck bed or the tailgate; and
wherein the spool is engageable with the pin mechanism to lock the locking assembly, and is disengageable from the pin mechanism to unlock the locking assembly; wherein the locking assembly further includes a pressurized cylinder and the cylinder is activated to move the locking assembly between a locked position and an unlocked position; and
a hinge assembly engaging a second region of the bed with a second region of the tailgate; and wherein the tailgate is selectively pivotable relative to the bed about a vertical axis extending through the hinge assembly or about a horizontal axis extending through both of the locking assembly and the hinge assembly.

5. The dump truck as defined in claim 4, wherein the pressurized pin mechanism includes:
a bracket having a first arm and a second arm aligned with each other; and
a gap is defined between the first arm and the second arm; and wherein the spool is selectively received in the gap between the first and second arms.

6. The dump truck as defined in claim 5, further comprising:
an aperture defined in the second arm;
a pin extending through the aperture; wherein
the pressurized cylinder is operatively engaged with the pin; and wherein the cylinder is activated in a first instance to move the pin through the aperture in a first direction; and the cylinder is activated in a second instance to move the pin through the aperture in a second direction.

7. The dump truck as defined in claim 6, wherein movement of the pin in the first direction at least partially obstructs the gap between the first and second arms; and movement of the pin in the second direction withdraws the pin from at least partially obstructing the gap between the first and second arms.

8. The dump truck as defined in claim 7, wherein the spool is captured in the gap when the pin is moved in the first direction and is thereby unable to be withdrawn from engagement with the bracket; and the spool is released from capture in the gap when the pin is moved in the second direction.

9. The dump truck as defined in claim 8, further comprising:
a cap engaged with a free end of the pin; and
a spring engaged around an exterior surface of the pin inwardly of the gap; and wherein one or both of the cap and spring limit the travel of the pin in the second direction.

10. The dump truck as defined in claim 9, wherein the cap has a curved outer surface and the spool has a curved groove defined in an exterior surface thereof; and wherein the curvature of a portion of the outer surface of the cap is complementary to the curvature of the groove; and wherein the portion of the outer surface of the gap is received in the groove when the locking assembly is in the locked position.

11. A method of engaging a tailgate to a trailer bed;
providing a spool extending outwardly from a side edge of the tailgate;
mounting a bracket to a sidewall of the bed; where the bracket includes at least a first arm and a second arm, and a first gap defined between the first and second arms;
swinging the gate to a closed position so that the spool enters the first gap;
actuating a pressurized cylinder to cause a piston rod to extend further outwardly therefrom;
pivoting a pin linked to the piston rod;

moving the pin upwardly through a first aperture defined in the second arm of the bracket;

continuing the pin movement until the pin blocks off the first gap; and securing the spool in the first gap using the pin.

12. The method as defined in claim 11, further comprising the step of:

rotating the tailgate about an axis that extends through the horizontally orientated spool when the pin is disposed to block off access to the first gap.

13. The method as defined in claim 11, further comprising the steps:

deactivating the pressurized cylinder;

withdrawing a length of the piston rod into the pressurized cylinder in response to the deactivation;

withdrawing a free end of piston from the first gap so that the first gap is no longer blocked off thereby;

pivoting the tailgate about a vertical axis disposed on an opposite side of the tailgate; and moving a first end of the tailgate from adjacent a rear end of the sidewall upon which a housing is mounted to a position remote therefrom.

14. The method as defined in claim 13, wherein the step of deactivating the pressurized cylinder further includes the steps of:

moving the linkage arm vertically downwardly relative to the housing as the piston rod is withdrawn into the pressurized cylinder; and compressing a coil spring disposed around an exterior region of the pin.

15. The method as defined in claim 14, further comprising the step of compressing the coil spring between a bottom end of a cap and an upper surface of the first arm.

16. The dump truck as defined in claim 1, wherein the pin moves linearly along the second axis.

17. The dump truck as defined in claim 1, wherein the bracket includes a third arm; and a space is defined between the second and third arms; and wherein a portion of the pin spans the space; and a spring is provided around the portion of the pin which is located in the space between the second and third arms.

18. The dump truck as defined in claim 4, wherein the pin moves linearly along an axis that is oriented at right angles to the spool, and the pin is moved in a first direction along the axis into the locked position and is moved in a second direction along the axis into the unlocked position.

* * * * *